United States Patent [19]

Giesy

[11] Patent Number: 5,213,275
[45] Date of Patent: May 25, 1993

[54] REEDING EDGE FOR SECURING IN PLACE FIBER BAND DURING FILAMENT WINDING OPERATION

[75] Inventor: Ronald K. Giesy, Katy, Tex.

[73] Assignee: General Dynamics Corporation, Space Systems Division, San Diego, Calif.

[21] Appl. No.: 731,698

[22] Filed: Jul. 17, 1991

[51] Int. Cl.⁵ .................................................. B65H 54/00
[52] U.S. Cl. ...................................... 242/1; 242/7.21; 242/47; 242/159; 242/176
[58] Field of Search ............... 242/1, 7.21, 7.22, 47, 242/118.3, 118.32, 50, 53, 159, 174, 176, 177, 178, 7.01

[56] References Cited

U.S. PATENT DOCUMENTS

| | | | |
|---|---|---|---|
| 3,255,889 | 6/1966 | Goldman et al. | 242/178 X |
| 4,080,915 | 3/1978 | Bompard et al. | 242/7.21 X |
| 4,917,756 | 4/1990 | Cahuzac et al. | 242/7.21 X |

Primary Examiner—Stanley N. Gilreath
Attorney, Agent, or Firm—John R. Duncan; Frank D. Gilliam

[57] ABSTRACT

An improved mandrel for use in filament winding. Two embodiments are described for a new filament winding mandrel concept. The first embodiment comprises a plurality of spaced apart slots machined at an angle along the ends of the central mandrel section for use with machines of at least three degrees of motion. A second embodiment comprises a series of two circumferential rows of axial fins protruding along the circumference of the central section of the mandrel for use with machines having only two degrees of motion. A second configuration of the second embodiment is an addition of a strip of slots that are simply placed around and secured to the circumference of the mandrel at locations where fiber turn around is desired. This provides for fiber securing in place with minimal rather than requiring machining the axial fins into the tool.

7 Claims, 2 Drawing Sheets

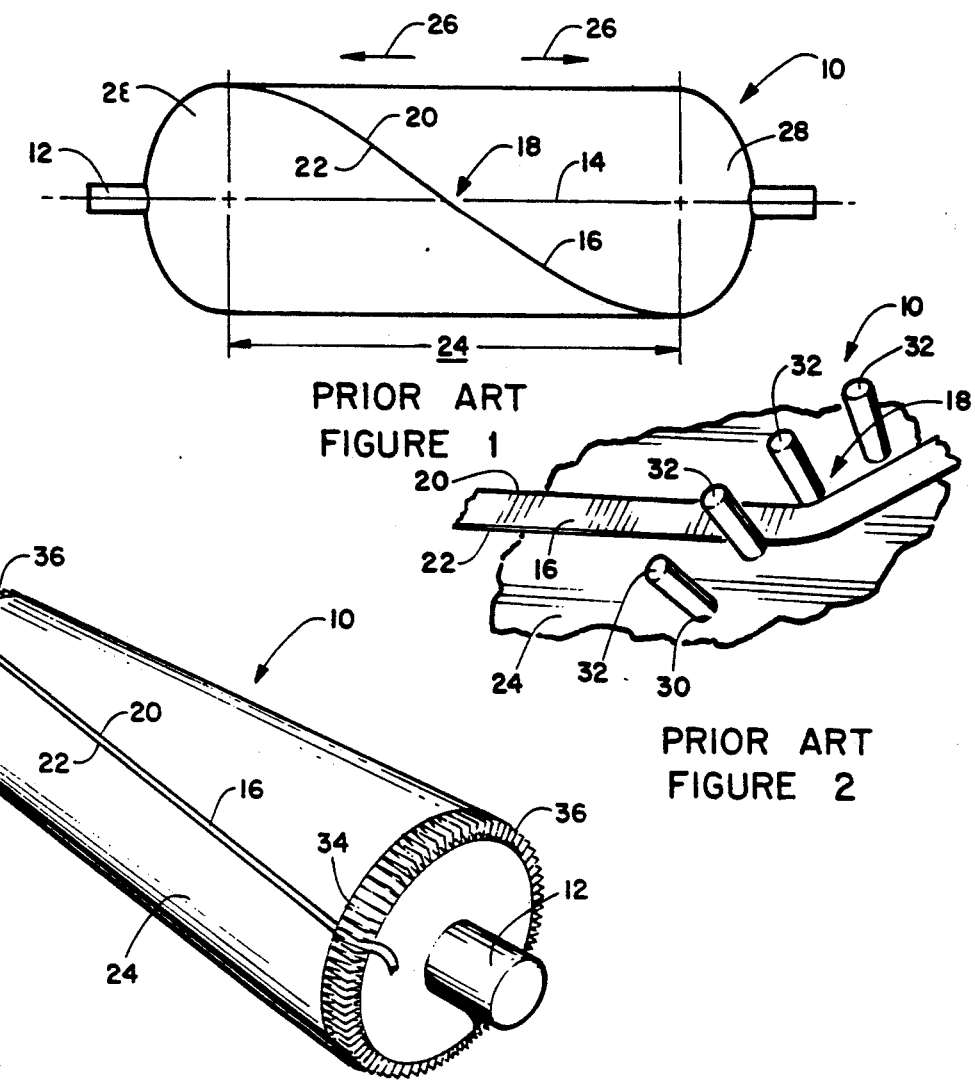
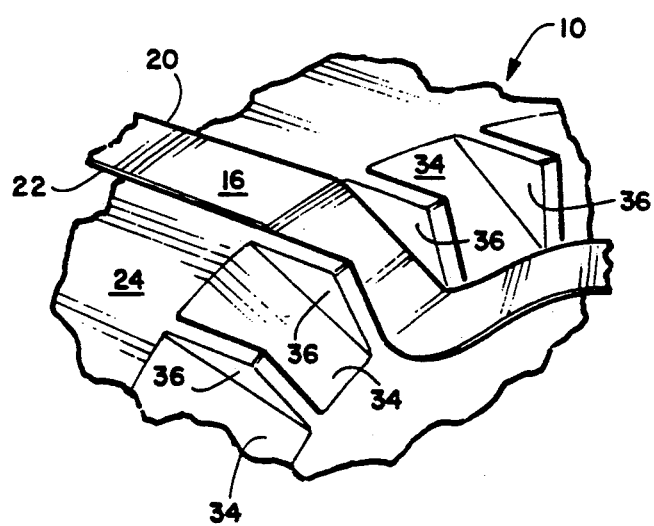

REEDING EDGE FOR SECURING IN PLACE FIBER BAND DURING FILAMENT WINDING OPERATION

BACKGROUND OF THE INVENTION

The invention is directed to tooling for filament winding and more particularly a mandrel with improved means for reversing the fiber runs at selected low angles.

Traditionally filament winding tooling depicted in drawing FIG. 1 denoted as prior art incorporates a central section composed of a body of revolution, i.e. a cylinder, cone, etc, bounded by hemispherical end domes connected to the center shafts or poles. The smooth surface translation between the central section and the end domes usually prevents the placement of very low angle windings, i.e. less than 10 degrees, due to slippage of the fiber tows.

When vary low angle wrappings are desired, two common approaches are employed.

The first approach utilizes dowel pins protruding from the circumference of the ends of the central section as shown in drawing FIG. 2. The pins are used to secure the fiber tows in place prior to rotation of the mandrel 10 and the reversal of the horizontal carriage motion, not shown. The use of dowel pins has several disadvantages. Establishment of the proper pin spacing along the circumference is crucial to assuring complete coverage of the tool surface without excessive gaps between adjacent fiber bands. The dowel pin spacing is limited to the band width chosen and the band width itself cannot be too large or movement of the fiber tows within a single band will result in unacceptable gaps between adjacent bands. The use of dowel pins also introduces additional machining time and cost during fabrication of the mandrel as numerous pin holes are required to attach the dowel pins. This typically involves a center drill, rough drill and reaming operation for each dowel pin hole required along the circumference of each end of the mandrel. This approach is often limited to reusable metal mandrels as the dowel pin hole fabrication operations would be required for each use of disposable mandrels constructed of plastic, sand, etc., and the inherent fragility of these materials limits most machining operations.

The second approach to produce low angle fiber placement involves the use of staged resin pre-impregnated unidirectional fiber material (prepreg tape). The prepreg tape is either placed in pieces manually along the length of the mandrel or a prepreg tape laying head is used in conjunction with the filament winding operation. The need to include a manual operation in order to provide low angle fiber placement defeats the efficiency of high volume material placement inherent with filament winding. The use of prepreg tape laying head requires a halt in production to change over the mandrel supply and delivery system from wet filament winding set-up to a dry prepreg arrangement and back again or the expensive and complex addition of a dual filament winding/tape laying delivery system.

There has not been a completely successful means and method and particularly a low cost convenient means and method for placement of very low angle winding until the emergence of the present invention.

SUMMARY OF THE INVENTION

The present invention provides a new and novel tooling concept for providing a method and means for providing a successful, efficient and a low cost tooling for filament winding at very low angles.

The tooling of the present invention replaces the dowel pins protruding along the circumference of the ends of the central section of the mandrel with a series of short axial slots. The result referred to as a "reeding edge" provides a mechanism to secure the fiber tows in place prior to revolution of the mandrel and reversal of the carriage motion. The reeding edge takes advantage of the efficiency of high material placement inherent with filament winding while simplifying the tooling by reducing the machining complexity, thus lowering the mandrel fabrication costs.

One embodiment comprises a series of beveled slots machined at an angle along the ends of the central section of the mandrel. This embodiment is for use on a filament winding machine with at least three degrees of motion, i.e. mandrel revolution, horizontal and vertical carriage motion. The reeding edge allows very low angle fiber placement, as low as zero degrees axial with a slight drop in vertical height of delivery eye required to secure the fiber band into the reeding edge followed by mandrel rotation to maintain fiber tension and reversal of the horizontal carriage motion. The precise matching of the reeding edge slot with the fiber band width is not required. The thin fins between slots split the fiber band creating very slight separation of adjacent fiber tows while maintaining complete tool surface coverage up to the reeding edge. The use of this type of reeding edge allows the tool diameter to be the maximum allowed by the filament winding machine capabilities since no surface protrusions, i.e. dowel pins, exist. The reeding edges placed along the ends of the central section also eliminate the need for hemispherical end domes allowing greater tool lengths to be wound and reducing the tool complexity and fabrication cost.

In the second embodiment of the reeding edge of this invention comprises a series of axial fins protruding along the circumference of the central section of the mandrel. The fins create slots along the tool surface which secure the fiber bands in place prior to revolution of the mandrel and reversal of the horizontal carriage motion. This reeding edge embodiment can be used on a filament winding machine with only two degrees of motion, i.e. mandrel rotation and horizontal carriage motion. Such machines are commonly used for the fabrication of simple cylindrical parts. The reeding edge allows for very low angle fiber placement, as low as 0 degrees, with no vertical carriage motion required. The carriage would simply advance far enough to place the fiber band into the reeding edge using a low eye height preferably followed by mandrel rotation to maintain fiber tension and reversal of the horizontal carriage motion. The precise placement of the fiber band within a single reeding edge slot is not required. The thin fins between slots split the fiber band creating very slight separation of adjacent fiber tows while maintaining complete tool surface coverage up to the reeding edge. This particular reeding edge is well suited for filament winding on only a portion of the length of the tool surface since the turn-around can be accomplished anywhere along the tool (mandrel) surface. This capability allows very low angle fiber placement on a tool containing integral attachment rings or bulkhead structures.

Another sufficient benefit of the reeding edge aspect of the present invention is that the reeding edge itself need not be an integral part of the mandrel. The reeding edge can be a separate strip that is simply placed around the circumference of the mandrel at locations where a fiber turn around is desired. The reeding edge can be made of either the same material as the mandrel, i.e., in the case of a reusable tool, or even of a low cost material such as, plastic. The use of a separate reeding edge strip allows the mandrel to be as simple as a cylinder with no secondary machining operations required. This embodiment is especially ideal for disposable mandrels which can be cast as simple shells upon which reeding edge strips can be placed to allow low angle fiber placement. The reeding edge need not be dimensionally stable throughout the subsequent curing operation as a simple wrapping of loop fiber bands near the reeding edge will secure the low angle fiber bands in place. This allows for possible removal of the reeding edge strip prior to curing the windings.

The benefits of the reeding edge tooling of the present invention are many. The ability to filament wind very low angle fiber bands, of angles less than 10 degrees, takes full advantage of the efficiency of high volume material placement inherent with filament winding. By eliminating the need to wind fiber bands at relatively high angles when the use of dowel pins is impractical, the sacrifice in axial stiffness this creates can be avoided. This will provide thinner part walls, lighter, stiffer structures and reduced material usage. The reduction or complete elimination of secondary machining operations greatly lowers the cost of mandrel fabrication. The elimination of end domes simplifies the tool construction and allows an increase in tool length. The reeding edge concepts are applicable to both reusable and disposable mandrels. The overall effect is a substantial decrease in tool costs with an increase in production rates.

An object of this invention is to produce a filament winding tool (mandrel) for producing very low angle filament windings.

Another object of this invention is to produce an inexpensive disposable mandrel that can produce very low angle filament windings.

Another object of this invention is to produce filament windings with angles relative to the longitudinal center line of the mandrel of less than 10 degrees.

Still another object of this invention is to produce windings with angles relative to the longitudinal center line of the mandrel less and greater than ten degrees.

Still another object of this invention is to produce an inexpensive filament winding mandrel that does not require the normally expected end domes.

Yet another object of this invention is to produce an attachment to a mandrel that can be applied to the surface of the mandrel.

Other objects and features of the invention will become apparent as the drawings which follow are understood by reading the corresponding description thereof.

BRIEF DESCRIPTION OF THE DRAWING FIGURES

FIG. 1 depicts a schematic showing of a mandrel of a prior art showing the wind angle;

FIG. 2 depicts a schematic showing of a mandrel of the prior art using dowl pins located on the mandrel winding surface;

FIG. 3 depicts an elevated perspective showing of one embodiment of a mandrel of the invention;

FIG. 4 depicts an enlarged section of the end of the mandrel of FIG. 3;

DETAILED DESCRIPTION OF THE PREFERRED EMBODIMENTS

Figure 5:
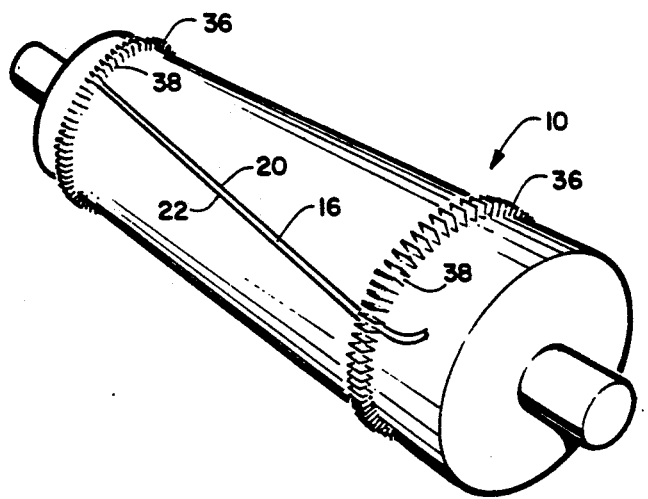
FIG. 5 depicts an elevated perspective showing of a second embodiment of the invention.

Drawing FIGS. 1 and 2 depict a conventional state of the art mandrel 10. The mandrel is rotated by a pole 12 about a longitudinal axis 14. A filament 16 is shown wound partially about the mandrel and forms a typical angle 18 with the center line 14. The filament has a width defined between reference characters 20 and 22. The mandrel includes a central section defined between the ends of line 24. Each end of the central section includes a domed end cap 28 about which the filaments are normally wound. As the mandrel rotates about its longitudinal axis a carriage not shown lays the filament on the mandrel The travel of the carriage is defined by line 24. The mandrel rotates and the carriage translates until sufficient filament is laid on the surface of the mandrel.

Drawing FIG. 2 depicts a present state of the art method of turning the filaments prior to the end of the mandrel wherein lower winding angles are required than can be accommodated by the use of end domes. A plurality of selectively placed apertures 30 are formed near the central extreme portions of the mandrel. A dowel pin 32 is inserted into one of or selected ones of the apertures to provide a guide pin for securing the rovings of the filaments as they are wound on to the mandrel.

Referring now to drawing FIGS. 3 and 4 which depict one of the preferred embodiments of the present invention. In this embodiment the mandrel 33 has a plurality of cuts 34 in both distal ends of the central section 24 of the mandrel. This mandrel of the present invention does not have and does not require the dome ends as shown in drawing FIG. 1 as the slots act to secure the filament rovings as shown.

Figure 6:
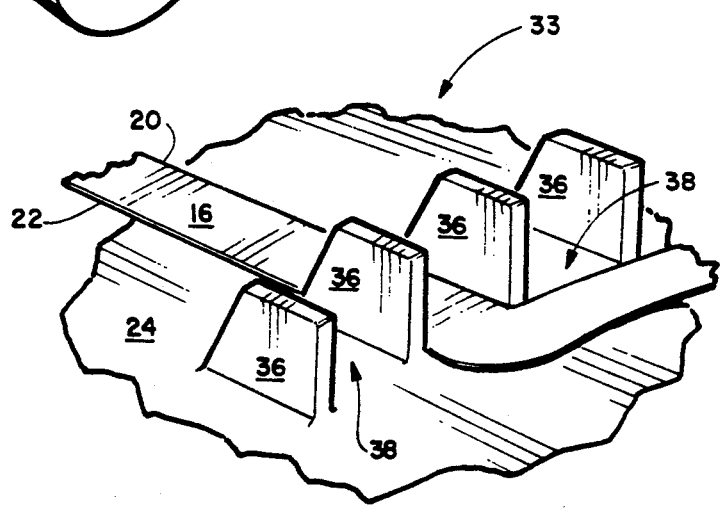
FIG. 6 depicts an a partial cutaway showing of the embodiment of FIG. 5.

Referring now to drawing FIGS. 5 and 6 which depict the other preferred embodiment of the present invention. In this embodiment a series of thin axial fins 36 protrude from the body portion 24 of a mandrel type 33, as shown in the drawing FIGS. 3 and 4, and extend circumferentially around the mandrel at two spaced apart locations. Slots 38 are provide between the protrusions 36. The filament passes through the slots and are secured as shown.

Figure 7:
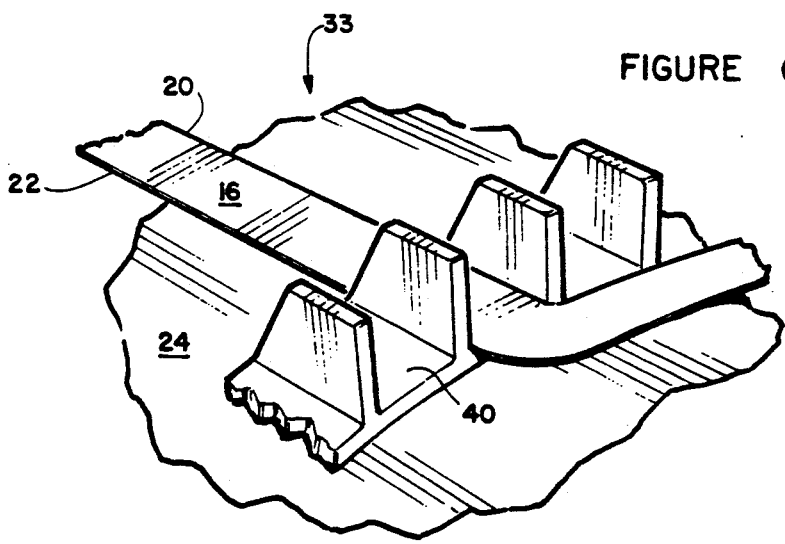
FIG. 7 depicts a partial cutaway showing of a second version of the second embodiment of FIG. 5.

Drawing FIG. 7 is a second version of the embodiment as shown in drawing FIGS. 5 and 6. In this version of the last embodiment, the protrusions are attached as an integral band 40 around the mandrel as shown. As shown in drawing FIG. 5, two spaced apart bands which are an equivalent to the two circles of protrusions 36 are used on the mandrel.

The various materials of construction of the components of the mandrel and protrusions are chosen to be suitable for the purposes intended. They can be machined or cast from metal, plastic or the like and can be solid or hollow as required.

While specific embodiments of the novel mandrel have been shown and fully explained above for the purpose of illustration it should be understood that many alterations, modifications and substitutions may be made to the instant invention disclosure without departing from the spirit and scope of the invention as defined by the appended claims.

What is claimed is:

1. An improved mandrel having a longitudinal center line for filament winding thereon to form filament wound structures comprising:

said mandrel having a uniform diameter body portion and a plurality of spaced apart elongated walls extending substantially parallel with said longitudinal centerline of said mandrel forming rectilinear slots therebetween positioned circumferentally around said mandrel adjacent at least one end of the mandrel for receiving and for positioning filament being wound upon said mandrel at a low angle relative to said centerline along the surface of said mandrel.

2. The improved mandrel as defined in claim 1 wherein said uniform diameter body portion comprises a cylinder.

3. The improved mandrel as defined in claim 1 wherein said plurality of spaced apart walls are positioned adjacent each end of said mandrel.

4. The improved mandrel as defined in claim 1 wherein said walls are formed as protrusions positioned on and extending from the surface of said mandrel intermediate to its end.

5. The improved mandrel as defined in claim 4 wherein two spaced apart circumferential rows of protrusions forming said slots therebetween are positioned intermediate said ends of said mandrel.

6. The improved mandrel defined in claim 1 wherein said plurality of walls are integrally connected to a band and said band is attached circumferentially to said mandrel.

7. The improved mandrel as defined in claim 1 wherein the ends of said mandrel are substantially squared off.

* * * * *